Figure 1:
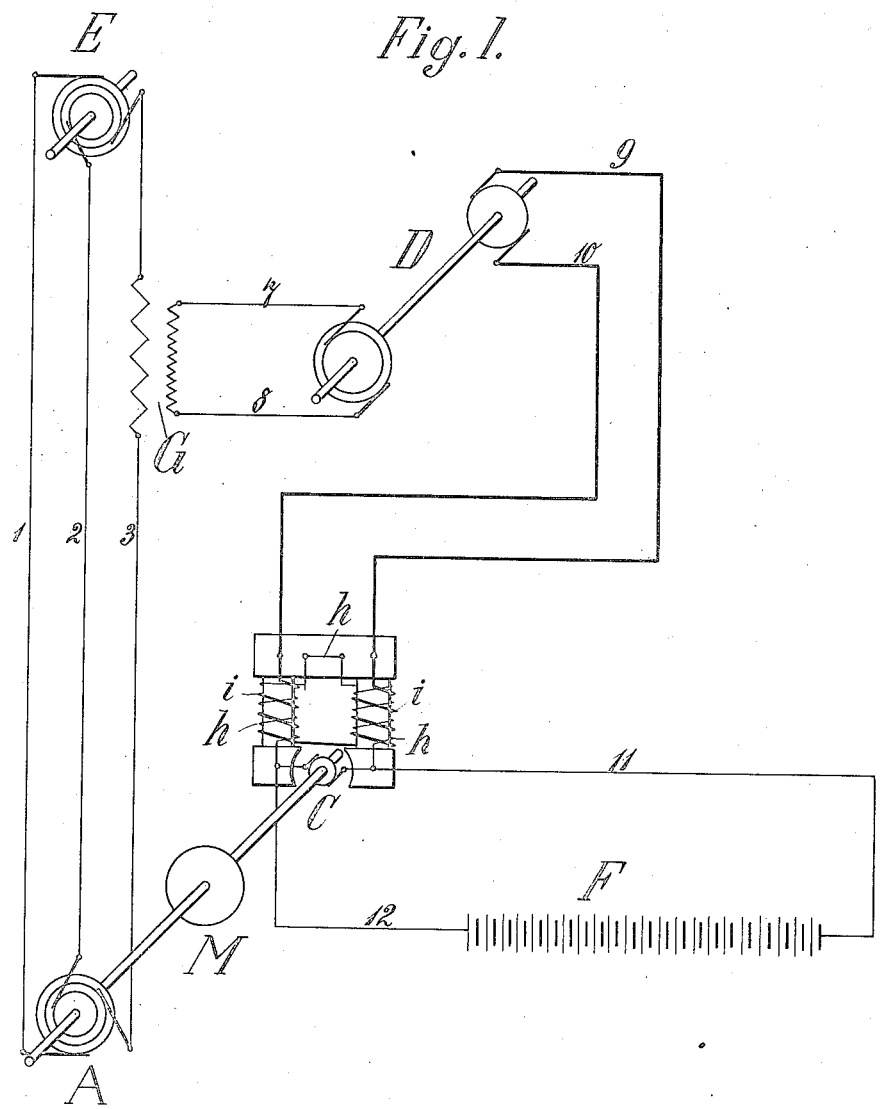

No. 847,974. PATENTED MAR. 19, 1907.
L. SCHRÖDER & A. MÜLLER.
ALTERNATING CURRENT PLANT COMBINED WITH STORAGE BATTERY.
APPLICATION FILED JULY 14, 1905.

4 SHEETS—SHEET 2.

WITNESSES:
W. M. Hay
J. P. Davis

INVENTORS
Ludwig Schröder
Adolph Müller
BY Munn & Co
ATTORNEYS

No. 847,974. PATENTED MAR. 19, 1907.
L. SCHRÖDER & A. MÜLLER.
ALTERNATING CURRENT PLANT COMBINED WITH STORAGE BATTERY.
APPLICATION FILED JULY 14, 1905.

4 SHEETS—SHEET 4.

WITNESSES:
W. M. Avery
J. P. Davis

INVENTORS
Ludwig Schröder
Adolph Müller
BY
Munn & Co.
ATTORNEYS

UNITED STATES PATENT OFFICE.

LUDWIG SCHRÖDER AND ADOLPH MÜLLER, OF BERLIN, GERMANY.

ALTERNATING-CURRENT PLANT COMBINED WITH STORAGE BATTERY.

No. 847,974. Specification of Letters Patent. Patented March 19, 1907.

Original application filed October 7, 1904, Serial No. 227,527. Divided and this application filed July 14, 1905. Serial No. 269,632.

*To all whom it may concern:*

Be it known that we, LUDWIG SCHRÖDER, a citizen of the free and Hanseatic town Hamburg, Empire of Germany, and a resident of 31ᵃ Luisenstrasse, Berlin, Germany, and ADOLPH MÜLLER, a subject of the Prince of Waldeck, Dominion of the Prince Friedrich von Waldeck, Empire of Germany, and a resident of 31ᵃ Luisenstrasse, Berlin, Germany, have invented certain new and useful Improvements in Alternating-Current Plants Combined with Storage Batteries, of which the following is a specification.

Our invention relates to alternating-current plants combined with storage batteries, and has the purpose to regulate the charging and discharging of the storage battery in such a manner that if the current used in the plant varies the prime mover actuating the main generator continues working with constant load.

This application is for a division of our pending application, Serial No. 227,527, filed October 7, 1904.

As is well known, electric plants the currents of which are subjected to great fluctuations are combined with a storage battery being charged by the excess of current not used in the plant and discharging current into the plant if there is more current wanted than generated by the main generator. In alternating-current plants a motor-generator is to be used, as the storage battery can only be charged by a direct or continuous current, the alternating-current portion of this motor-generator being connected with the wires of the plant and the direct-current portion being connected with the storage battery. If a small current is used in the plant, the excess of current produced by the main generator will drive the motor-generator and the current produced by the direct-current portion will charge the battery. If, on the contrary, the plant uses more current than the main generator can produce, then the alternating portion of the motor-generator will be driven by the direct-current portion, the battery discharging current into this portion and producing alternating current assisting the current produced by the main generator. In this known system no special means were provided to regulate the charging and discharging current automatically, this regulating being done by hand by regulating the shunt of the direct-current portion of the transformer. The regulating of the charging and discharging current was automatical only in the case when by a strong declivity of the characteristic of the main generator the fluctuations of intensity cause the tension of the alternating current to rise or to fall considerably.

Now our invention consists in regulating automatically the charging and discharging current of the battery, even if there are no variations in the tension of the alternating-current plant, in such a manner that the prime mover actuating the main generator is working always with constant load.

We do not limit ourselves to any particular kind of alternating current, but preferably use the apparatus in connection with the so-called "polyphase" system, as shown in the accompanying drawings, forming a part of this specification, in which similar characters of reference indicate corresponding parts in all the figures.

Figure 2:
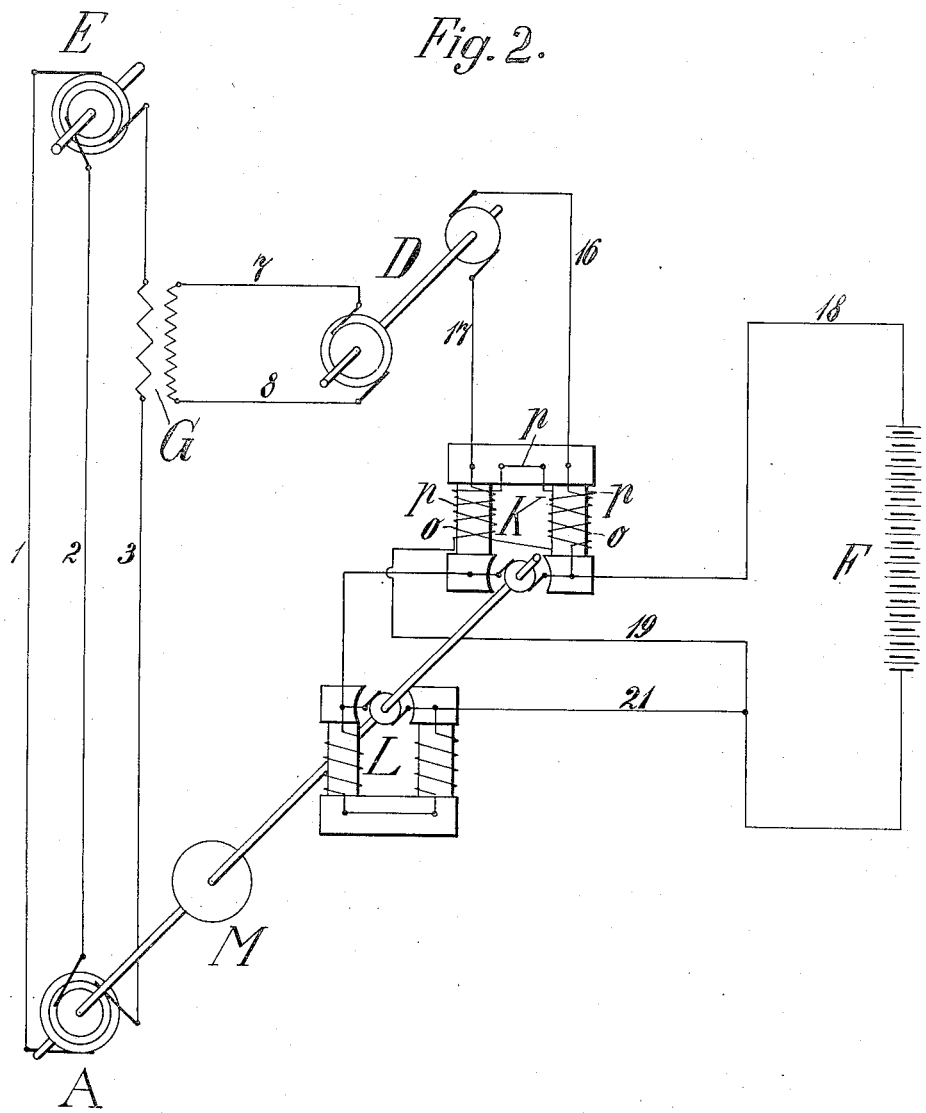
Figure 3:
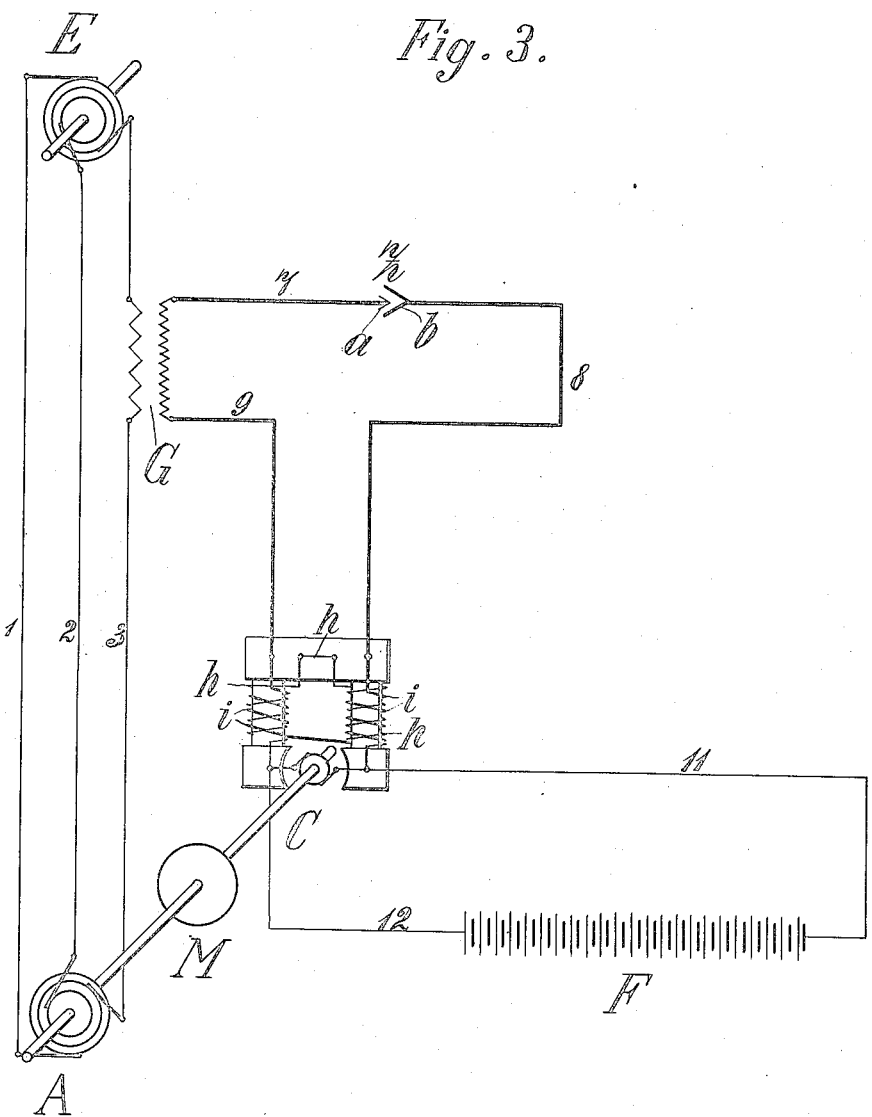
Figure 4:
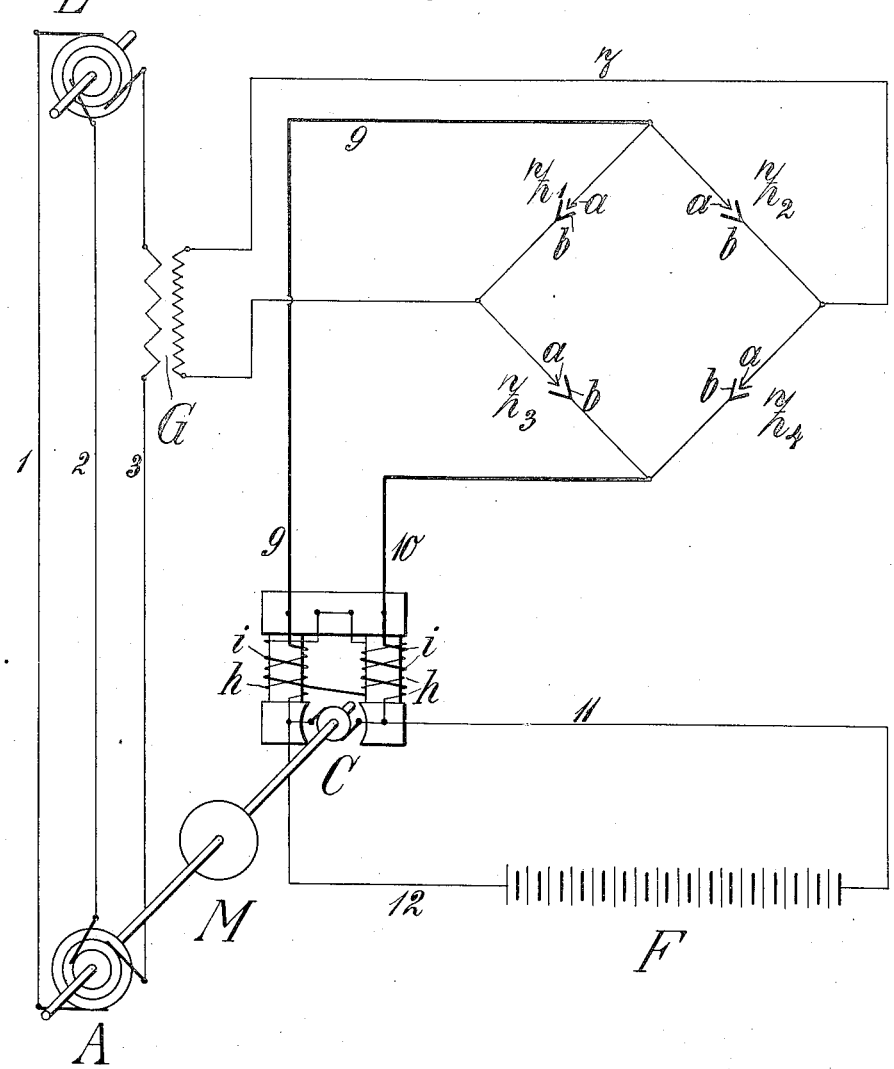

Figures 1 and 2 show different forms of the invention to be described more specially hereafter. Fig. 3 is a diagrammatic perspective view showing an arrangement somewhat similar to that in Fig. 1, but showing instead the rotary converter D and an electrolytic rectifier which transmits merely currents of negative sign, so that the field of the booster is excited by pulsations of the current from the rectifier; and Fig. 4 is a diagrammatic perspective view somewhat similar to Fig. 3, but showing some additional connections not present in Fig. 3.

In Fig. 1 the main alternating-current generator is shown at A, driven by a steam-engine, turbine, or another prime mover M, the main alternating-current motor at E, representing a whole plant, a storage battery at F, connected with the dynamo C, driven by the prime mover M. A transformer G is connected with the alternating-current portion of a rotary converter D, the direct portion of the latter being connected by the wires 9 10 with a winding $i$ upon the field of the dynamo C. Another winding $h$ upon the field of the direct-current dynamo C opposes the winding $i$ and is connected with the storage battery F by the wires 11 and 12.

The action of the system is as follows: The main generator A being energized and the current used in the plant E being very small, the current flowing through the secondary winding of G, being also small, will be converted by the rotary converter D into a small direct current flowing through the winding $i$.

At the same time the direct-current dynamo C is driven by the excess of power of the prime mover, so that the dynamo C generates current, which flows to the storage battery. The high electromotive force of this current necessary for charging the battery is produced by the field highly excited by the winding $h$ proportional to the electromotive force of the battery and weakened only in a small degree by the small current flowing through the opposite winding $i$. The battery F is therefore charged with a large current and a high electromotive force if the amount of current used in E is small. If an excess of current is wanted in E, the direct current in the winding $i$ is large, thereby weakening strongly the magnetic field and the electromotive force of the direct-current dynamo C to such a degree that the electromotive force of the battery F is greater than that of the dynamo C. Therefore the battery F is discharged into the dynamo C, energizing it as a motor and driving it, so that the prime mover is assisted by the dynamo C acting now as motor. Therefore if the amount of current used in the plant E is small the direct-current dynamo C acts as a generator, the electromotive force of which is augmented in the manner explained with reference to Fig. 1. If an excess of current is wanted in E, the electromotive force of C is diminished in the manner explained before, and the battery F is discharged into C, causing it to act as a motor and to help the motor M in driving the main generator A. In this arrangement the main generator A works at variable load, as it must furnish the whole amount of current as large or as small as may be wanted in the plant, and therefore the tension of the current will vary.

In the form of our invention shown in Fig. 3 the direct-current dynamo L as well as the booster are coupled with the prime mover M, this system acting in the same manner as the form Fig. 1, the main generator A working at variable load, as it furnishes the whole current used in E. On the contrary, the prime mover M is always working with constant load, as it is assisted by the dynamo L acting as motor if more current is used in E as produced by the main generator A, while the dynamo L produces current charging the battery F if less current is used in E.

In Fig. 2 the connections are the same as in Fig. 1, except that the dynamo L is connected to the prime mover instead of to the motor-generator.

In Fig. 3 the arrangement is very much like that shown in Fig. 1. The chief difference is in the fact that in this figure an electrolytic rectifier $z$, provided with terminals $a$ $b$, is substituted for the rotary converter D in Fig. 1. The purpose of the electrolytic rectifier is to insure that a direct through intermittent current will be sent through the winding $i$.

In Fig. 4 there are several electrolytic rectifiers $Z'$, $Z^2$, $Z^3$, and $Z^4$, each being provided with terminals $a$ $b$, so connected as to split the current induced by the transformer $g$, a part of this current returning directly to the transformer-secondary and a part being used to energize the winding $i$.

In all forms of the invention the rotary converter D may be of any suitable form and even be substituted by an electrolytic rectifier. Fig. 4 shows such electrolytic rectifier in combination with the form of the invention described with reference to Fig. 1. The secondary portion of the transformer G is connected by wire 7 to one or more aluminium plates $a$ of an electrolytic rectifier Z, the plates $b$ of which, consisting of another metal, are connected by wire 8 to the winding $i$ of the direct-current dynamo C, which is coupled with the prime mover M. The other end of the winding $i$ is connected directly with the secondary portion of the transformer G by wire 9. As is very well known, the aluminium electrodes $a$ of the electrolytic rectifier transmit only the negative parts of the alternating current, preventing the flowing of the other parts of the current. Fig. 5 shows another known form of this electrolytic rectifier in combination with our system. In this form there are four cells $Z'$ $Z^2$ $Z^3$ $Z^4$, the plates $a$ and $b$ of the cells $Z'$ and $Z^3$ being connected by wire 8 to the secondary portion of the transformer G and the plates $a$ and $b$ of the cells $Z^2$ and $Z^4$ being also connected by wire 7 to the transformer G. The winding $i$ of the direct-current dynamo C is connected by wire 9 to the plates $a$ of cell $Z'$ and $Z^2$ and by wire 10 to the plates $b$ of cell $Z^3$ and $Z^4$. By this means a pulsating direct current will flow through the winding $i$ of the direct-current dynamo C. Such electrolytic rectifier may be used in all other forms of the invention instead of the rotary converter D.

The booster K instead of being driven by the prime mover M may also be driven by any other motor or electric machine.

Having thus described our invention, we claim as new and desire to secure by Letters Patent—

1. In an alternating-current plant the combination of a direct-current machine coupled with the prime mover a storage battery connected with the machine, converting device connected with the wires of the plant and producing a direct current in a separate winding on the field of the direct-current machine charging the storage battery or being driven by the current of this battery and regulating thereby automatically the charging and discharging of the battery in such a manner that the prime mover actuating the main generator works with constant load.

2. The combination of an alternating-current generator, an alternating-current motor, electrical connections from said alternating-current generator to said alternating-current motor, a direct-current generator geared positively with said alternating-current generator and provided with a pair of field-windings in opposition to each other, means for actuating said alternating-current generator and said direct-current generator as a unit, a storage battery, connections from said direct-current generator thereto, means connecting said last-mentioned connections with one of said windings of said direct-current generator, and electrical mechanism controllable by currents from said alternating-current generator for energizing the other of said windings of said alternating-current generator.

3. In an alternating-current plant the combination of a direct-current machine coupled with the prime mover, a storage battery connected with this machine a booster driven by suitable means and converting devices connected with the wires of the plant and producing a direct current in a separate winding on the field of the booster and regulating thereby automatically the charging and discharging of the battery in such a manner that the prime mover actuating the main generator works with constant load.

4. The combination of a direct-current generator provided with two field-windings in opposition to each other, a storage battery supplied by said direct-current generator and connected with one of said field-windings for energizing the latter, a separate generator connected mechanically with said direct-current generator, and electric mechanism controllable by said separate generator and connected with the other of said field-windings.

In witness whereof we have hereunto signed our names in the presence of two subscribing witnesses.

LUDWIG SCHRÖDER.
ADOLPH MÜLLER.

Witnesses:
HENRY HASPER,
WOLDEMAR HAUPT.